United States Patent
Mohammad et al.

(10) Patent No.: US 12,162,417 B2
(45) Date of Patent: Dec. 10, 2024

(54) SEAT POSITION SENSOR ARRANGEMENT FOR AN AUTOMOTIVE VEHICLE

(71) Applicants: TE Connectivity Services GmbH, Schaffhausen (CH); TE Connectivity Germany GmbH, Bensheim (DE); Tyco Electronics France SAS, Pontoise (FR); Tyco Electronics Canada ULC, Ontario (CA)

(72) Inventors: Irshad Mohammad, Winston Salem, NC (US); Earl Daniel Swope, Winston Salem, NC (US); Christian Berger, Speyer (DE); Lucian Iordache, Markham (CA); Michael Ludwig, Bensheim (DE); Bruno Contion, Clebebourg (FR)

(73) Assignee: TE CONNECTIVITY SOLUTIONS GMBH ET AL, Schaffhausen (CH)

(*) Notice: Subject to any disclaimer, the term of this patent is extended or adjusted under 35 U.S.C. 154(b) by 407 days.

(21) Appl. No.: 17/144,718

(22) Filed: Jan. 8, 2021

(65) Prior Publication Data

US 2021/0213902 A1   Jul. 15, 2021

(30) Foreign Application Priority Data

Jan. 10, 2020 (EP) .................... 20305015

(51) Int. Cl.
 *B60R 21/015* (2006.01)
 *B60N 2/02* (2006.01)
 *G01D 5/20* (2006.01)
(52) U.S. Cl.
 CPC ...... *B60R 21/01554* (2014.10); *B60N 2/0224* (2013.01); *G01D 5/20* (2013.01)

(58) Field of Classification Search
 CPC ... B60R 21/01554; B60N 2/0224; G01D 5/20
 See application file for complete search history.

(56) References Cited

U.S. PATENT DOCUMENTS

| | | | |
|---|---|---|---|
| 5,751,129 A * | 5/1998 | Vergin | B60N 2/0248 318/625 |
| 6,820,895 B2 * | 11/2004 | Levine | B60N 2/002 296/68.1 |
| 7,195,261 B2 * | 3/2007 | Yoshida | B60N 2/067 324/207.21 |
| 2008/0005913 A1 * | 1/2008 | Kachouh | G01D 5/2452 33/1 PT |
| 2013/0184942 A1 | 7/2013 | Cuddihy et al. | |

FOREIGN PATENT DOCUMENTS

EP   1879087 A2   1/2008
FR   3073472 A1   5/2019

OTHER PUBLICATIONS

Extended European Search Report, European Application No., 20305015.8-1010, European Filing Date, Jul. 1, 2020.

\* cited by examiner

*Primary Examiner* — Reena Aurora

(57) ABSTRACT

A seat position sensor arrangement for measuring a position of a seat with respect to a fixed part of an automotive vehicle includes a driving mechanism, a pair of wheels rotatably coupled by the driving mechanism and rotating with different angular speeds upon being driven by the driving mechanism, and at least one rotation sensor subassembly corresponding to each of the wheels. Each rotation sensor subassembly measures an angle of rotation of one of the wheels.

14 Claims, 4 Drawing Sheets

SEAT POSITION SENSOR ARRANGEMENT FOR AN AUTOMOTIVE VEHICLE

CROSS-REFERENCE TO RELATED APPLICATION

This application claims the benefit of the filing date under 35 U.S.C. § 119 of European Patent Application No. 20305015, filed on Jan. 10, 2020.

FIELD OF THE INVENTION

The present invention relates to a sensor arrangement and, more particularly, to a seat position sensor arrangement for measuring the position of a seat with respect to a fixed part of an automotive vehicle.

BACKGROUND

Seat position sensor arrangements are used to determine the position of a vehicle seat with respect to the chassis of the vehicle. Knowledge of the seat position may be important for safety systems in a vehicle. In particular, the inflation of an airbag may be adapted with respect to a seat position. In other words, the airbag inflation may be increased the farther away a person is seated from the airbag. Vice versa, the airbag inflation may be reduced when a person is seated closer to the airbag, in order to avoid injury to the person's body from the airbag.

Seat position sensor arrangements known in the art often only distinguish between two positions, for example, a position close to the airbag and a position farther away from the airbag. However, in order to adjust the inflation of an airbag with a higher accuracy with respect to the seat position, for example, a higher resolution of the seat position is needed.

SUMMARY

A seat position sensor arrangement for measuring a position of a seat with respect to a fixed part of an automotive vehicle includes a driving mechanism, a pair of wheels rotatably coupled by the driving mechanism and rotating with different angular speeds upon being driven by the driving mechanism, and at least one rotation sensor subassembly corresponding to each of the wheels. Each rotation sensor subassembly measures an angle of rotation of one of the wheels.

BRIEF DESCRIPTION OF THE DRAWINGS

The invention will now be described by way of example with reference to the accompanying Figures, of which.

DETAILED DESCRIPTION OF THE EMBODIMENT(S)

In the following, the invention and its improvements are described in greater detail using exemplary embodiments and with respect to the drawings. The various features shown in the embodiments may be used independently from each other in specific applications. In the following figures, elements having the same function and/or the same structure will be referenced by the same reference signs.

Figure 1:
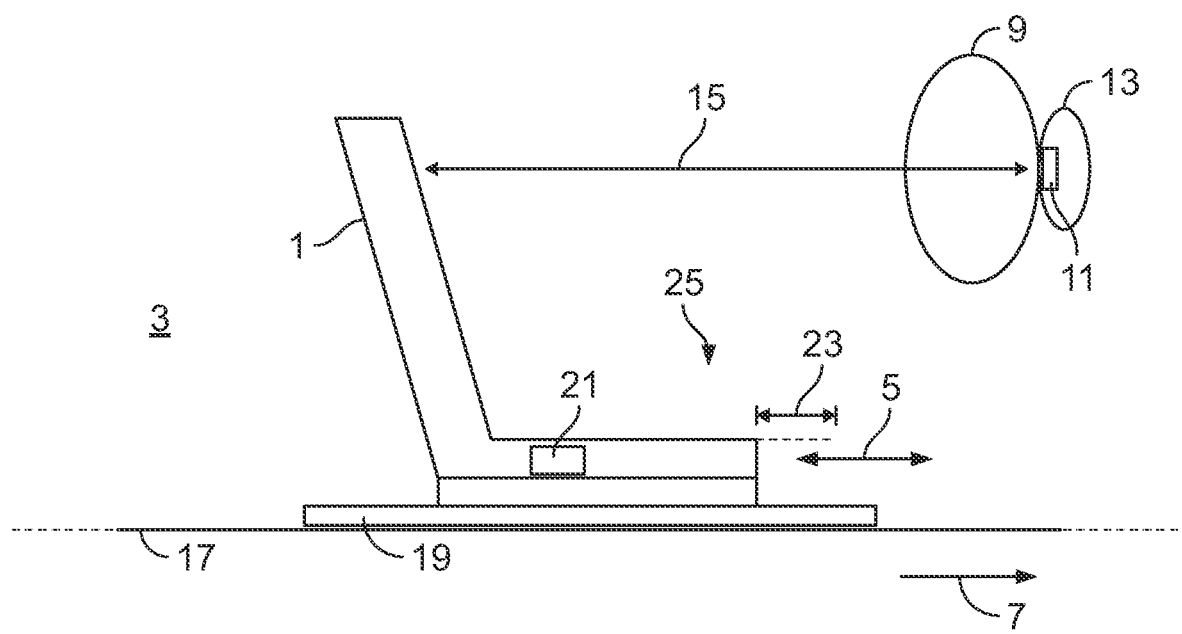
FIG. 1 is a schematic diagram of a vehicle seat and an airbag.

A vehicle seat 1 is arranged inside a vehicle 3, as shown in FIG. 1. The vehicle seat 1 is movable along a seat travel direction 5, which is parallel to a driving direction 7 of the vehicle 3 in an embodiment. The vehicle 3 has an airbag 9, which is controlled by an airbag control system 11. Usually, the airbag 9 is seated in a steering wheel 13 of the vehicle 3. Just by way of example, the airbag control system 11 is shown as part of the steering wheel 13 in FIG. 1.

The airbag 9 can be inflated when an accident is detected. An amount of inflation of the airbag 9 is controlled depending on a distance 15 between the steering wheel 13 and the seat 1. When the distance 15 is large and a person on the seat 1 is far away from the steering wheel 13, the airbag 9 should be inflated to a larger volume and/or gas pressure compared to a smaller distance 15, when a person is located closer to the steering wheel 13. In order to control the amount of inflation of the airbag 9, the distance 15 should be known. The distance 15 can be derived or at least estimated when the position of the seat 1 with respect to a fixed part of the vehicle 3, such as a chassis 17, is known.

The seat 1 is movable along the seat travel direction 5 with respect to the chassis 17. The seat 1 may be movably arranged on seat rails 19, which are fixed to the chassis 17. Just by way of example, FIG. 1 shows the seat 1 having a seat position sensor arrangement 21 according to the invention. In the alternative, the arrangement 21 could also be arranged on the chassis 17, in particular on one of the seat rails 19. The seat position sensor arrangement 21 may be adapted to either measure a travel distance 23 of the seat 1 along the seat travel direction 5, or an absolute position 25 of the seat 1. In an embodiment, the seat position sensor arrangement 21 is connected with the airbag control system 11, either via a wired connection or a wireless connection.

In the following, a first advantageous embodiment of the seat position sensor arrangement 21 is described with respect to FIGS. 2 and 3. The seat position sensor arrangement 21 has a pair of wheels 27, 29. The two wheels 27, 29 are adapted to rotate with different angular speeds when they are driven by a same driving mechanism 31. The two wheels 27, 29 are rotatably coupled by the driving mechanism 31. The driving mechanism 31 is formed as a drive gear 33 and the two wheels 27, 29 are formed as gear wheels 35, 37. The gear wheels 35, 37 are rotatably coupled by the drive gear 33 due to the gears of the wheels 33, 35, 37 engaging with each other. In this embodiment, the driving mechanism 31 is arranged on a seat side 49 of the arrangement 21. The seat side 49 is attachable to the movable seat 1. In other words, the at least one driving mechanism 31 may also keep its relative position to the wheels 27, 29 when the seat 1 is moved along the seat travel direction 5. The wheels 27, 29 are driven upon a movement of the seat 1. In another embodiment, at least one of the wheels 27, 29 may be a friction wheel.

Figure 2:
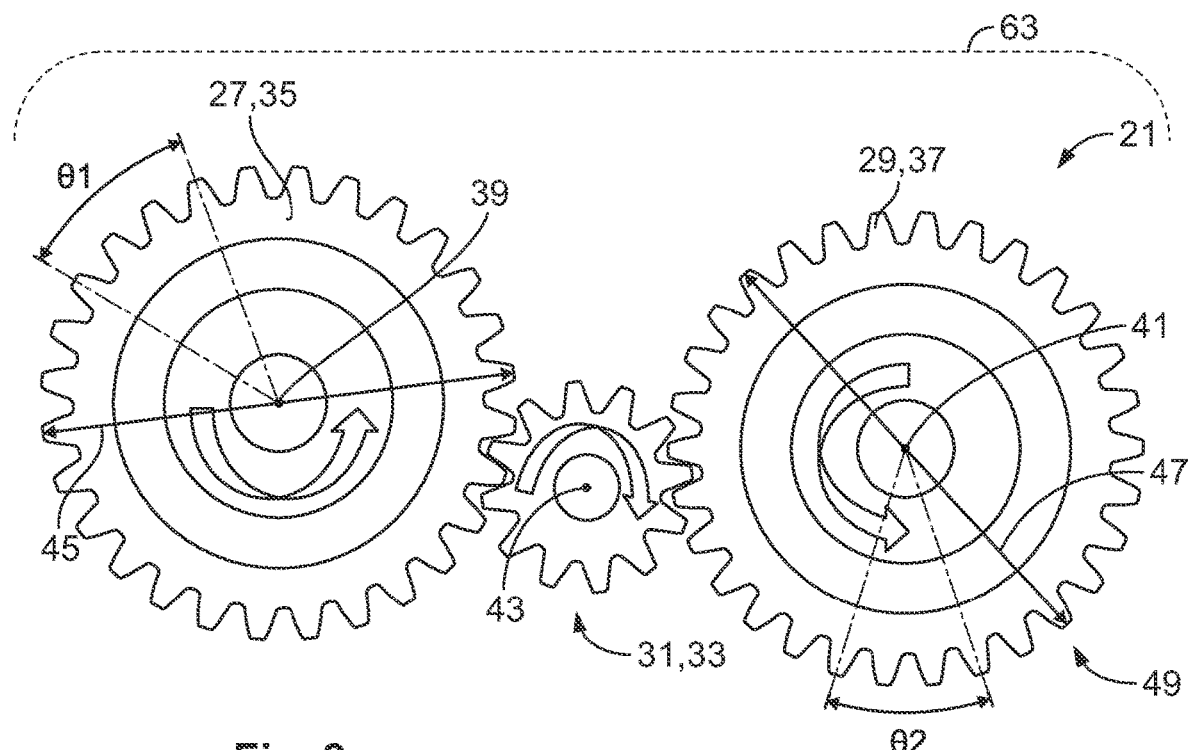
FIG. 2 is a side view of a seat position sensor arrangement according to an embodiment.
Figure 3:
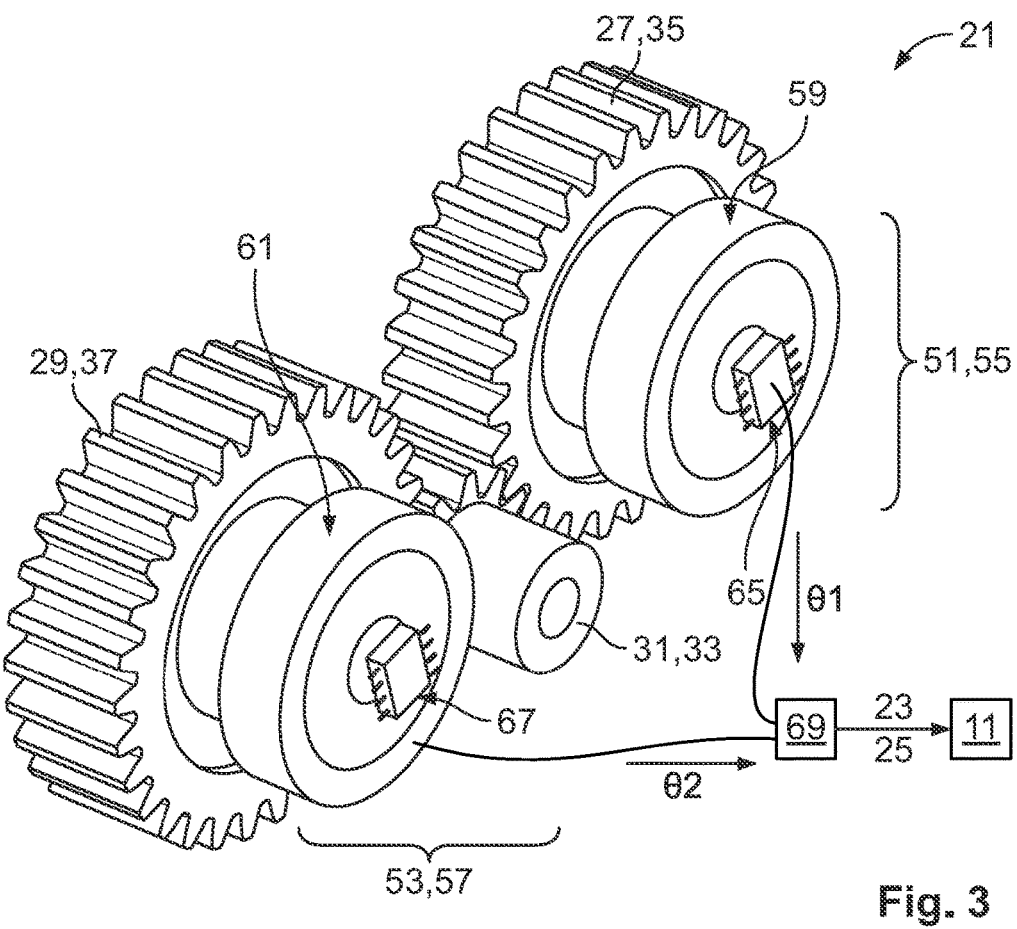
FIG. 3 is a perspective view of the seat position sensor arrangement of FIG. 2 with magnets and sensor elements.

As shown in the embodiment of FIGS. 2 and 3, the drive gear 33 is arranged between and functionally coupled to the gear wheels 35, 37. The drive gear 33 may engage both wheels 35, 37, thereby driving them when the drive gear 33 rotates. Each of the wheels 27, 29, 33 is rotatable around an axis of rotation, 39, 41, 43. In an embodiment, all axes of rotation 39, 41, 43 are parallel to each other. In FIG. 2, the axes 39, 41, 43 are perpendicular to a plane of the paper.

The wheel 27 has a diameter 45, which is different from a diameter 47 of the wheel 29, just by way of example, smaller as shown in FIGS. 2 and 3. Due to the difference in diameters, the wheels 27, 29 will rotate with different angular speeds upon being driven by the driving mechanism 31. In other words, when the driving mechanism 31 or drive gear 33 rotates for a certain amount of time, the wheels 27, 29 will move with the same circumferential speed which is predetermined by the speed of the drive gear 33. The at least one driving mechanism 31 may be regarded as a prime mover that drives the wheels 27, 29, for example, with the same circumferential speed. In another embodiment, a different way of generating different angular speeds may be a gearing mechanism in at least one of the wheels 27, 29.

Due to the difference in diameters, an angle of rotation $\theta 1$ of the smaller wheel 27 is larger than an angle of rotation $\theta 2$ of the larger wheel 29. Due to the different angular speeds of the wheels 27, 29, the wheels 27, 29 can be regarded as a Vernier scale or Nonius. In other words, rotating both wheels 27, 29 at the same time will introduce an angle offset between both wheels 27, 29 that can be used for calculating the seat position.

The drive gear 33, in an embodiment, is coupled to a seat motor for driving the seat 1 along the seat rails 19. This can be achieved by providing the drive gear 33 with a connection element that is connectable to the seat motor, such as a shaft or an opening into which a shaft from the seat motor may be inserted. Consequently, driving the seat 1 by the seat motor will automatically rotate the wheels 27, 29 such that the seat travel distance 23 may easily be derived.

In order to measure the angles $\theta 1$, $\theta 2$, the arrangement 21 has a rotation sensor subassembly 51, 53 for each of the wheels 27, 29, as shown in FIG. 3. Each rotation sensor subassembly 51, 53 is a magnetic sensor arrangement 55, 57 in the shown embodiment. At least one rotation sensor subassembly 51, 53 may be a magnetic sensor arrangement, such as a Hall sensor element. At least one of the rotation sensor subassemblies 51, 53 may be a rotary encoder. In the alternative, the rotation sensor subassemblies 51, 53 may also be formed by other sensor arrangements, for example an optic encoder, a mechanical rotation sensor, or capacitive sensor arrangements.

In another embodiment, at least one of the rotation sensor subassemblies 51, 53 is formed by an inductive sensor arrangement. For example, a conductive coil may be used as a sensor element forming a stator element of the inductive sensor arrangement. During measurement, the conductive coil is used as a conductor by allowing an electric current to flow through the same. On the corresponding wheel, a passive element can be placed as a rotor element of the inductive sensor arrangement. The conductive coil of the stator element can be used to induce an electric current in the passive element that, in turn, can be measured, in particular by the stator element. The passive element of the rotor may also comprise at least one conductive coil.

Each magnetic sensor arrangement 55, 57 has a magnet 59, 61, as shown in FIG. 3, wherein each magnet 59, 61 is rotatably coupled to its corresponding wheel 27, 29. Furthermore, each magnetic sensor arrangement 55, 57 has a magnetic sensor element 65, 67 which is arranged in the vicinity of its corresponding magnet 59, 61 in order to measure the magnetic field of the corresponding magnet 59, 61 and thereby detect the rotation of each magnet 59, 61. The relative position of the sensor element 65, 67 with respect to the magnet 59, 61 is fixed with respect to longitudinal movements. In other words, when a wheel 27, 29 rotates, it generates a rotation of its respective magnet 59, 62, and the magnetic sensor element 65, 67 detects this rotation by measuring the changing magnetic field. The magnetic sensor element 65, 67 does not rotate with the magnet 59, 61, but moves together with the wheel 27, 29 along the seat travel direction 5 when the seat 1 moves.

Each of the magnets 59, 61 has at least two magnetic poles. In the alternative, each magnet 59, 61 can be provided with multiple poles in order to increase the resolution of the sensor subassemblies 51, 53.

As shown in FIG. 3, the magnetic sensor elements 65, 67 are connected to a data processing device 69, which is adapted to receive the angles of rotation $\theta 1$, $\theta 2$, and to calculate the seat travel distance 23 and/or the seat position 25 and submit the same to the airbag control system 11. The data processing device 69 includes a non-transitory computer readable medium and a processor executing instructions stored on the non-transitory computer-readable medium to receive the angles of rotation $\theta 1$, $\theta 2$, calculate the seat travel distance 23 and/or the seat position 25, and transmit the same to the airbag control system 11. The seat travel distance 23 may for example be calculated from an offset between the angles $\theta 1$, $\theta 2$. The device 69 may be arranged with the other elements of the arrangement 21, in particular with elements of the seat side 49 in a common housing 63 of the arrangement 21, shown in FIG. 2. In the alternative, the device 69 could be part of the airbag control system 11 or of a vehicle control system.

Figure 4:
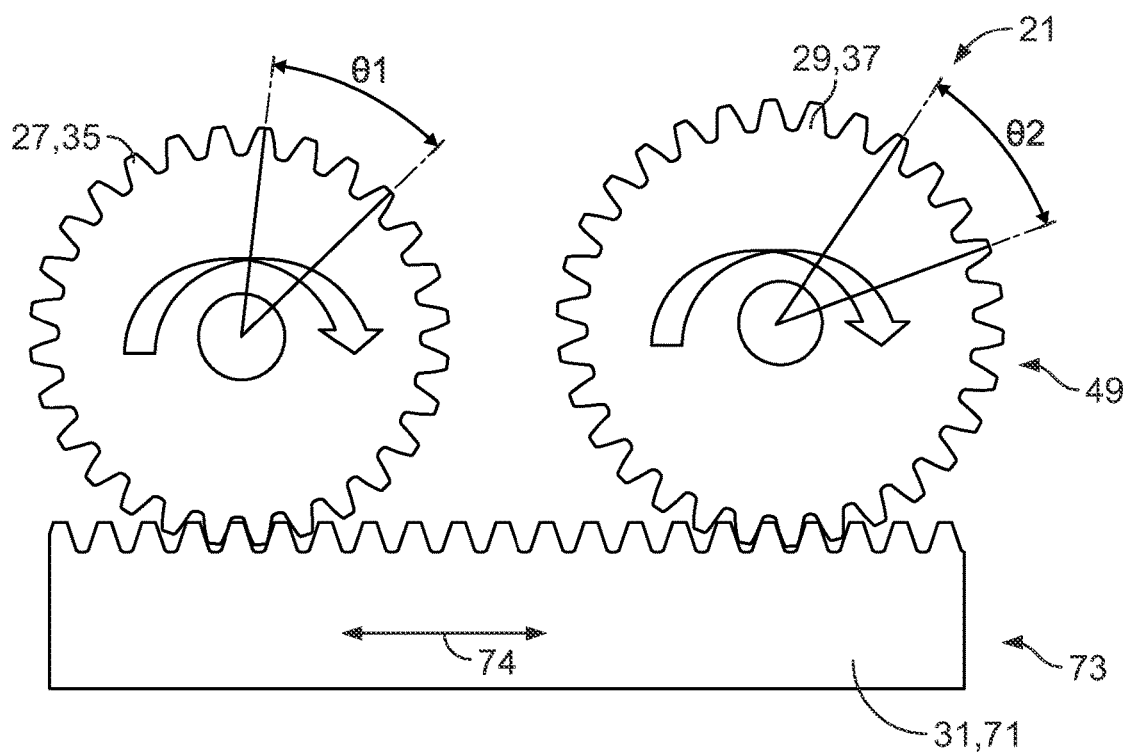
FIG. 4 is a side view of a seat position sensor arrangement according to another embodiment.
Figure 5:
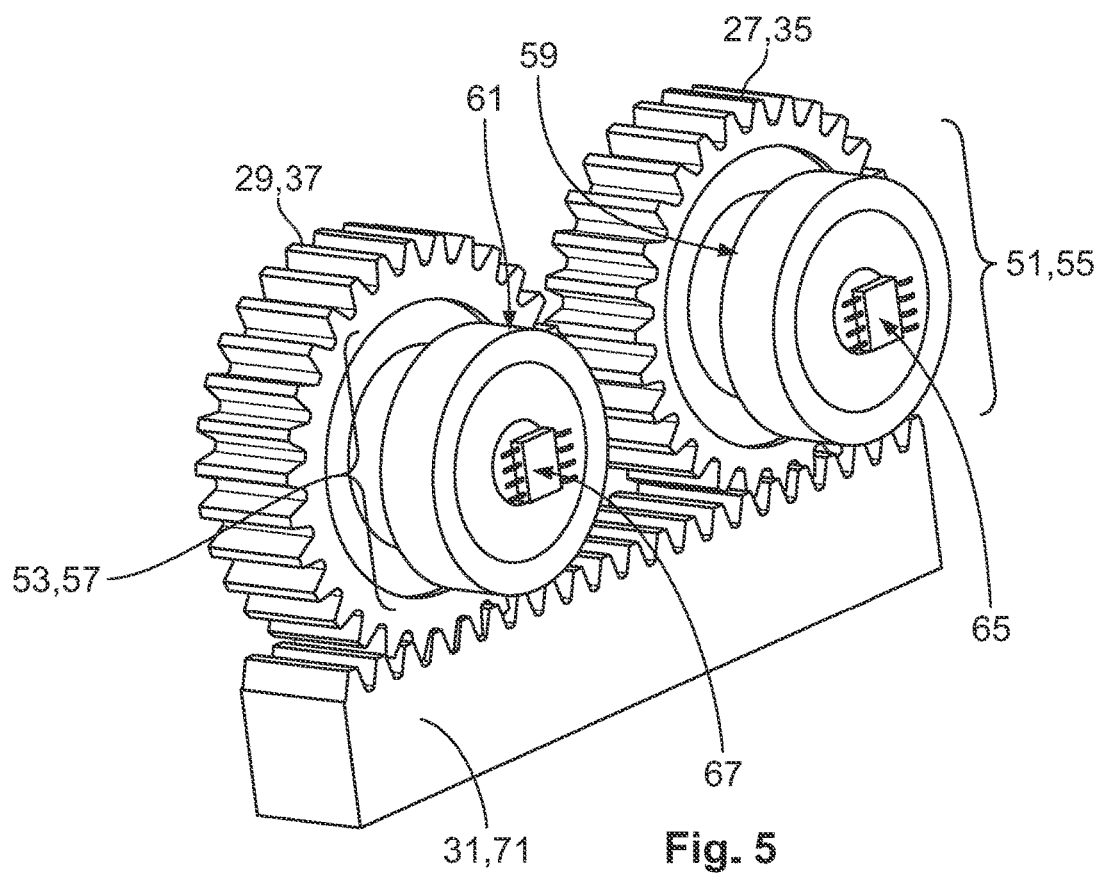
FIG. 5 is a perspective view of the seat position sensor arrangement of FIG. 4 with magnets and sensor elements.

A seat position sensor arrangement 21 according to another embodiment is shown in FIGS. 4 and 5. For the sake of brevity, only the differences to the embodiment described with respect to FIGS. 2 and 3 are described in detail.

In contrast to the first mentioned embodiment, the seat position sensor arrangement 21 of the second embodiment has a driving mechanism 31 that is formed as a gear rack 71, as shown in FIGS. 4 and 5. The gear rack 71 extends with a longitudinal direction 74 parallel to the seat travel direction 5 in the shown embodiment. The gear rack 71 may be fixed to the chassis 17 and/or one of the seat rails 19. In other words, the gear rack 71 may be arranged on a chassis side 73 of the sensor arrangement 21, whereas the remaining parts, i.e. the wheels 27, 29 and the rotation sensor subassemblies 51, 53, are arranged on the seat side 49 of the arrangement and move together with the seat 1. The chassis side 73 is attachable to the chassis 17 of the vehicle 3. When the seat 1 moves along the seat travel direction 5, the wheels 27, 29 which engage the gear rack 71 will be driven by the gear rack 71 with the same circumferential speed, and thereby rotating with different angular speeds. In the alternative, this arrangement can also be reversed.

In the embodiment shown in FIGS. 4 and 5, when the seat 1 moves along the seat travel direction 5, the wheels 27, 29 are set into rotational motion by the gear rack 71 and, as described before, rotate with different angular speeds, thereby resulting in different angles of rotation $\theta 1$, $\theta 2$. As mentioned before, these angles of rotation $\theta 1$, $\theta 2$ can be detected by the rotation sensor subassemblies 51, 53. A data processing device 69 may calculate the seat travel distance 23 and/or the seat position 25 and submit the same to the airbag control system 11. The data processing device 69 may, for example, be an integrated circuit, such as an application-specific integrated circuit (ASIC). The data processing device 69 is arranged inside the common housing 36, in particular together with at least one of the rotation sensor subassemblies 51, 53 or at least a part thereof.

Figure 7:
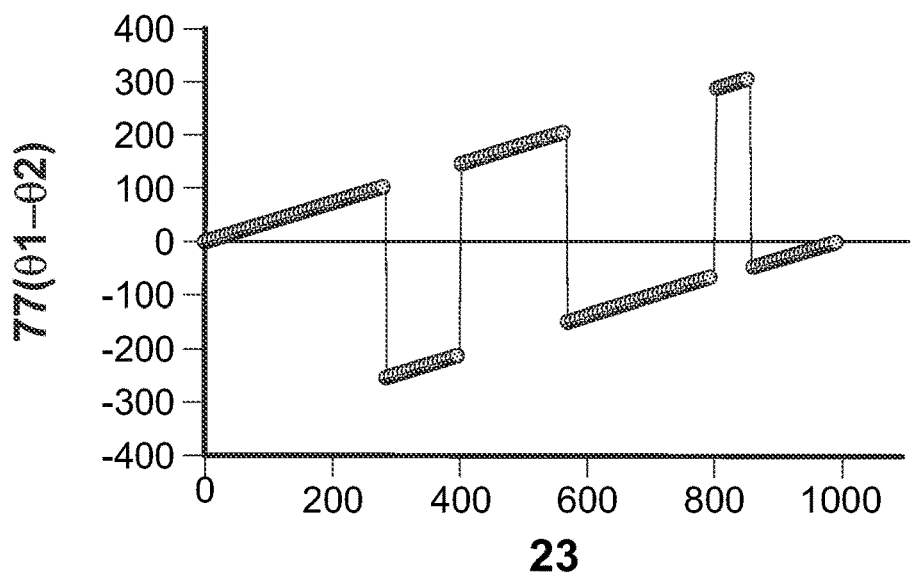
FIG. 7 is a graph of a difference between angular positions of the sensor elements in FIG. 6.
Figure 8:
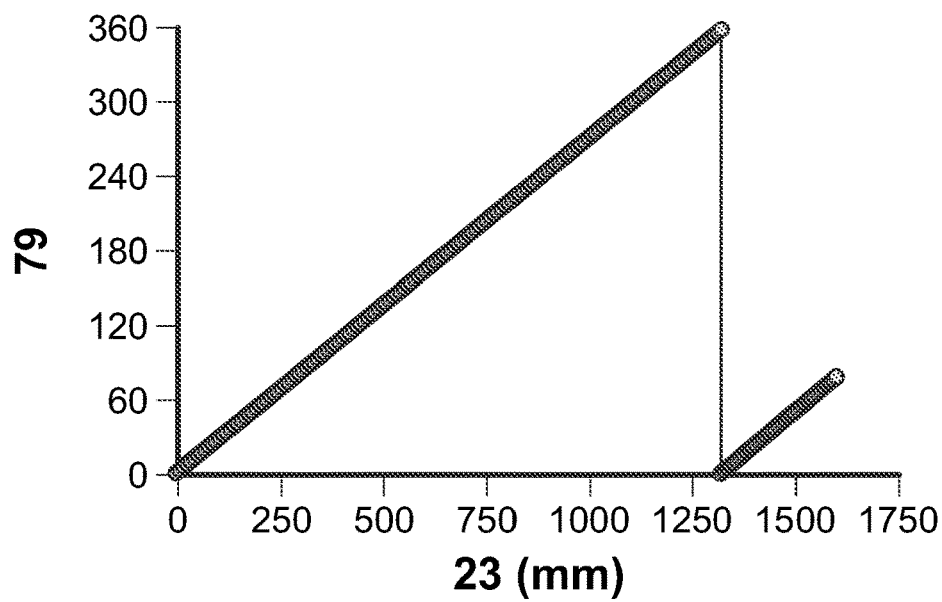
FIG. 8 is a graph of an angle offset over a unique linear travel position derived from the values of FIG. 7.

In the following, computing the seat travel distance 23 from the measured angles $\theta 1$, $\theta 2$ is briefly described with respect to FIGS. 6 to 8. The following method of calculating or computing can be performed in the device 69. It should be noted that also other ways of calculating the seat travel distance 23 from the measured angles $\theta 1$, $\theta 2$ are possible.

Figure 6:
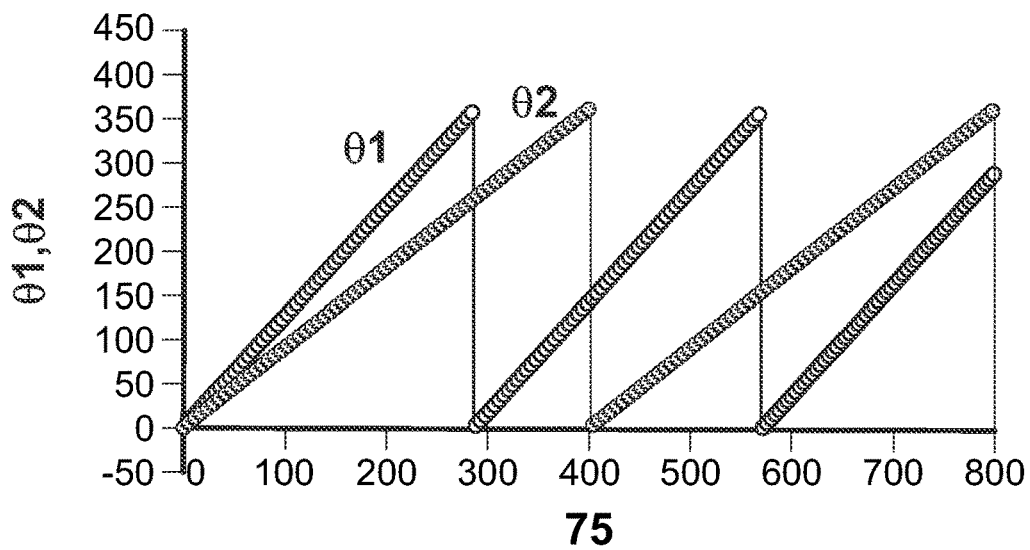
FIG. 6 is a graph of sensor outputs of sensor elements.

In FIG. 6, the sensor output $\theta 1$, $\theta 2$ is shown, wherein the abscissa shows a travel distance 75 of the circumferences of the wheels 27, 29. From the angles $\theta 1$, $\theta 2$, an angular difference 77 may be calculated, which is shown in FIG. 7, wherein the abscissa shows the travel direction 23. Finally, from the angular difference 77, an angle offset 79 can be calculated, which is shown in FIG. 8. The angle offset 79 directly relates to the travel position 25 and/or the seat travel distance 23. As mentioned above, using the offset 79 represents only one possible way of calculating the travel position 25 and/or the seat travel distance 23.

Consequently, the seat position 25 can be derived from the angle offset 79 measured by the seat position sensor arrangement 21. In the shown example, the seat position 25 or travel distance 23 can be measured along a wide range of about 1,300 mm, in this example, wheels 27, 29 having diameters of 28 and 30 mm have been used. The data processing device 69 is therefore adapted to compute the position of the seat 1 depending on an offset of the two angles of rotation.

The at least one data processing device 69 is adapted to submit a value representing the seat position 25 and/or the seat travel distance 23 to an airbag control system 11 of the vehicle 3. The data processing device 69 may therefore be provided with a data connection, either a wire-based or a wireless connection.

The seat position sensor arrangement 21 that allows for a reliable determination of the seat 1 position, along a long range and with a required resolution. Furthermore, the seat position sensor arrangement 21 manufacturable in a simple and cost efficient way.

What is claimed is:

1. A seat position sensor arrangement for measuring a position of a seat with respect to a fixed part of an automotive vehicle, comprising:
   a driving mechanism movable with respect to the seat;
   a pair of wheels rotatably coupled by the driving mechanism, having different diameters, and rotating with different angular speeds due to the different diameters upon being driven by the driving mechanism;
   at least one rotation sensor subassembly corresponding to each of the wheels, each rotation sensor subassembly measures an angle of rotation of one of the wheels; and
   a data processing device receiving the angle of rotation of each of the wheels from the rotation sensor subassemblies, the data processing device calculates a seat position and/or a seat travel distance from an angular difference between the angle of rotation of each of the wheels that results from the different angular speeds of the wheels.

2. The seat position sensor arrangement of claim 1, wherein at least one of the wheels is a gear wheel.

3. The seat position sensor arrangement of claim 1, wherein the driving mechanism is arranged on a seat side of the seat position sensor arrangement.

4. The seat position sensor arrangement of claim 3, wherein the driving mechanism is a drive gear.

5. The seat position sensor arrangement of claim 1, wherein the driving mechanism is a gear rack.

6. The seat position sensor arrangement of claim 1, wherein the at least one rotation sensor subassembly is a magnetic sensor arrangement.

7. The seat position sensor arrangement of claim 1, wherein the at least one rotation sensor subassembly is an inductive sensor arrangement.

8. The seat position sensor arrangement of claim 1, wherein the seat position sensor arrangement is connected to the seat and moves together with the seat.

9. The seat position sensor arrangement of claim 1, wherein the wheels and the corresponding rotation sensor subassemblies are connected to the seat and move together with the seat.

10. The seat position sensor arrangement of claim 9, wherein the driving mechanism is fixed to a fixed part of the automotive vehicle.

11. The seat position sensor arrangement of claim 1, wherein the data processing device is arranged inside a common housing of the seat position sensor arrangement.

12. A vehicle seat, comprising:
   a seat position sensor arrangement for measuring a position of the vehicle seat with respect to a fixed part of a vehicle, the seat position sensor arrangement including a driving mechanism movable with respect to the vehicle seat, a pair of wheels rotatably coupled by the driving mechanism, having different diameters, and rotating with different angular speeds due to the different diameters upon being driven by the driving mechanism, at least one rotation sensor subassembly corresponding to each of the wheels, each rotation sensor subassembly measures an angle of rotation of one of the wheels, and a data processing device receiving the angle of rotation of each of the wheels from the rotation sensor subassemblies, the data processing device calculates a seat position and/or a seat travel distance from an angular difference between the angle of rotation of each of the wheels that results from the different angular speeds of the wheels.

13. A data processing device executing instructions stored on a non-transitory computer readable medium to perform the steps comprising:
   receiving a pair of angles of rotation of a pair of wheels that rotate with different angular speeds when a vehicle seat is moved, the pair of wheels have different diameters and rotate with the different angular speeds due to the different diameters; and
   computing a seat position and/or a seat travel distance of the vehicle seat with respect to a fixed part of a vehicle based on an angular difference between the pair of angles of rotation that results from the different angular speeds of the wheels.

14. A method for determining a seat position and/or a seat travel distance of a vehicle seat with respect to a fixed part of an automotive vehicle, comprising:
   driving a pair of wheels upon movement of the vehicle seat, the wheels have different diameters and rotate with different angular speeds due to the different diameters;
   measuring an angle of rotation of each of the wheels; and
   calculating a seat position and/or a seat travel distance from an angular difference between the angle of rotation of each of the wheels that results from the different angular speeds of the wheels.

* * * * *